United States Patent Office 2,760,845
Patented Aug. 28, 1956

2,760,845

STABILIZED FUMING NITRIC ACID

Irving A. Kanarek, Los Angeles, and Paul E. Frieberts-hauser, Van Nuys, Calif., assignors to North American Aviation, Inc.

No Drawing. Application May 4, 1953,
Serial No. 352,996

5 Claims. (Cl. 23—157)

This invention pertains to an oxidizer mixture and in particular to nitric acid, red fuming nitric acid, or white fuming nitric acid together with an additive of hydrogen fluoride.

Nitric acid alone is an oxidizer. The use of nitric acid in the form of red fuming nitric acid or white fuming nitric acid has not been successful where the ambient temperature of the fuel during storage is very low. This invention contemplates an additive to nitric acid and particularly an additive to red or white fuming acid which lowers the freezing point of the resultant mixture. Nitric acid, including red and white fuming nitric acid, is very corrosive and causes deterioration of its container when it is stored for an appreciable length of time. In addition, the oxidizers generate an appreciable pressure due to the generation of decomposition products when they are stored for an extended period of time. When hydrogen fluoride or aqueous hydrogen fluoride is added to nitric acid and particularly when hydrogen fluoride or aqueous hydrogen fluoride is added to red or white fuming nitric acid, the corrosivity of the resultant oxidizer is inhibited, the freezing point of the resultant oxidizer is depressed, and the storage pressure of the resultant oxidizer is reduced. The additive is used in amounts of less than 5% by weight of hydrogen fluoride.

It is therefore an object of this invention to provide an oxidizer mixture which has a low freezing point.

A further object of this invention is to provide a freezing point depressant for fuming nitric acid.

A still further object of this invention is to provide an additive for nitric acid which inhibits the corrosion properties of the acid.

An additional object of this invention is to provide an improved oxidizer combination having a relatively low storage pressure.

Another object of this invention is to provide a freezing point depressant for white and red fuming nitric acid which decreases the corrosive effect of such acid on aluminum and aluminum alloys and reduces the storage pressure thereof.

Other objects of invention will become apparent from the following description.

The addition of small amounts of hydrogen fluoride in either an aqueous or anhydrous form lowers the freezing point of red fuming nitric acid from approximately —75° to —110° Fahrenheit. When anhydrous hydrogen fluoride is added, a definite eutectic forms when a concentration of 0.85% of hydrogen fluoride is used. The eutectic concentration has a freezing point of —99° Fahrenheit. The effect of hydrogen fluoride to depress the freezing point of red fuming nitric acid is sensitive to the nitrogen dioxide concentration of the red fuming nitric acid. For example, red fuming nitric acid with nitrogen dioxide approximately 22% by weight can be combined with a 3% by weight additive of aqueous hydrogen fluoride, which is approximately 52% hydrogen fluoride, and the freezing point of the eutectic is approximately —112° Fahrenheit. For another example, a mixture of red fuming nitric acid and nitrogen dioxide containing approximately 17% by weight nitrogen dioxide with 1.6% by weight addition of 52% by weight aqueous hydrogen fluoride has an eutectic point of approximately —112° Fahrenheit.

When red fuming nitric acid which contains 18% nitrogen dioxide is stored at, for example, a temperature of 165° Fahrenheit, the storage pressure in unvented containers increases over a period, for example, of two months to approximately 190 pounds per square inch. On the other hand, a mixture of red fuming nitric acid with 22% by weight nitrogen dioxide and 5% by volume of aqueous hydrogen fluoride which is 52% by weight hydrogen fluoride has a storage pressure in unvented containers at, for example, a temperature of 165° Fahrenheit of approximately 125 pounds per square inch after three months and approximately 70 pounds per square inch after six months in storage. For another example, a mixture of red fuming nitric acid and 22% by weight nitrogen dioxide together with 0.83% by weight anhydrous hydrogen fluoride develops a maximum pressure of 45 pounds per square inch at the end of a four-month storage at a temperature of 140° Fahrenheit. Thus, the additive, hydrogen fluoride, reduces the rate of rise of vapor pressure and in addition, reduces the total pressure of the red fuming nitric acid stored in unvented containers.

Red fuming nitric acid, stored in aluminum alloy containers, causes a high rate of corrosion which is reduced by the addition of hydrogen fluoride. For example, test samples of aluminum alloy which measured 0.064 inch by 0.5 inch by 1.0 inch immersed in red fuming nitric acid which contained 22% by weight nitrogen dioxide and 4% by volume of aqueous hydrogen fluoride having 52% by weight hydrogen fluoride showed an increase in weight when stored for ninety days at 140° Fahrenheit which ranged from 0.00127% per day to 0.00516% per day. After 180 days at 140° Fahrenheit the average weight gain of another sample was in the order of 0.0043% per day. Microscopic inspection of these tested samples revealed that all samples had a white crystalline deposit upon the aluminum surface with small pits from 0.001 to 0.002 inch deep and 0.002 to 0.003 inch wide, which is substantially less corrosion and pitting than the corrosion rate for red fuming nitric acid without the hydrogen fluoride additive.

Thus, the additive of this invention decreases the freezing point of nitric acid, red fuming nitric acid, or white fuming nitric acid; decreases the corrosion effect between the nitric acid, red fuming nitric acid, or white fuming nitric acid and its container, particularly if aluminum alloys are used for containers; and decreases the storage pressure at high ambient temperatures when nitric acid, red fuming nitric acid or white fuming nitric acid is stored in an unvented container.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An oxidizer mixture consisting essentially of fuming nitric acid and from about 0.83% to less than 5% by weight of hydrogen fluoride.

2. An oxidizer mixture consisting essentially of red fuming nitric acid and from about 0.83% to less than 5% by weight of hydrogen fluoride.

3. An oxidizer mixture consisting essentially of white fuming nitric acid and from about 0.83% to less than 5% by weight of hydrogen fluoride.

4. An oxidizer mixture consisting essentially of fuming nitric acid and hydrogen fluoride, the latter in an amount from 0.83 to 2.4 per cent by weight.

5. An oxidizer mixture consisting essentially of fuming nitric acid and approximately 0.85 per cent hydrogen fluoride by weight.

References Cited in the file of this patent
UNITED STATES PATENTS 2,048,362  Stoesser et al. _____ July 21, 1936

OTHER REFERENCES

Mellor: Comprehensive Treatise on Inorganic and Theoretical Chemistry, vol. 8, pp. 564, 585, 623, Longmans, Green and Co., London and New York (1922).